United States Patent
Remery et al.

(12)

(10) Patent No.: US 7,079,654 B1
(45) Date of Patent: Jul. 18, 2006

(54) METHOD FOR CARRYING OUT AN ELECTRONIC TRANSACTION USING SEVERAL SIGNATURES

(75) Inventors: Patrick Remery, Caen (FR); Aymeric De Solages, Caen (FR); Jacques Traore, Flers (FR)

(73) Assignees: France Telecom, Paris (FR); La Poste, Boulogne-Billancourt (FR)

( * ) Notice: Subject to any disclaimer, the term of this patent is extended or adjusted under 35 U.S.C. 154(b) by 778 days.

(21) Appl. No.: 10/031,039

(22) PCT Filed: Jul. 19, 2000

(86) PCT No.: PCT/FR00/02075

§ 371 (c)(1),
(2), (4) Date: Apr. 11, 2002

(87) PCT Pub. No.: WO01/06702

PCT Pub. Date: Jan. 25, 2001

(30) Foreign Application Priority Data

Jul. 20, 1999 (FR) .................................... 99 09396

(51) Int. Cl.
*H04L 9/00* (2006.01)
(52) U.S. Cl. ...................... 380/278; 713/170; 713/176; 713/180; 713/171; 705/64; 705/71

(58) Field of Classification Search ................ 380/278, 380/277, 282; 705/64, 71; 713/171
See application file for complete search history.

(56) References Cited

U.S. PATENT DOCUMENTS

| 5,097,115 A | * | 3/1992 | Ogasawara et al. | .......... 235/380 |
| 5,396,558 A | * | 3/1995 | Ishiguro et al. | ................ 705/67 |
| 6,105,862 A | * | 8/2000 | Pailles et al. | ................ 235/375 |

FOREIGN PATENT DOCUMENTS

| EP | 588 339 A | | 3/1994 |
| GB | 2261538 A | * | 5/1993 |
| WO | 42610 A | | 11/1997 |

* cited by examiner

*Primary Examiner*—Gilberto Barrón, Jr.
*Assistant Examiner*—Samson Lemma
(74) *Attorney, Agent, or Firm*—Pearne & Gordon LLP

(57) ABSTRACT

Method for carrying out an electronic transaction using several signatures.

In the present invention, entities (or actors) are spread over a communication network and share keys. A message is encapsulated inside several cryptograms, and intermediate entities progressively decapsulate the cryptograms that they receive.

The invention is applicable to all electronic transactions, in particular to "electronic wallet" applications.

7 Claims, No Drawings

METHOD FOR CARRYING OUT AN ELECTRONIC TRANSACTION USING SEVERAL SIGNATURES

FIELD OF THE INVENTION

The present invention concerns a method for carrying out an electronic transaction using several signatures.

It is suitable for all electronic transactions (teleshopping, telepayment, service access, etc.), such as smart cards for example. The invention is especially suitable for "electronic wallet" applications.

BACKGROUND OF THE INVENTION

Security in electronic transactions using smart cards is based on cryptographic techniques. The smart card chip's processor calculates and sends a digital signature for the transaction, constituting proof of the issuing party's agreement to the signature in the transaction. Said proof is specific to the issuing body that manages the application. Said digital signature is the result of a calculation based on the data identifying the card's issuer, terminal, transaction number, transaction amount and possibly the card bearer's account number.

The data is sent to the card's issuer who performs appropriate processing such as auditing the transaction by checking the signature, issuing it for payment, debiting the customer account, crediting the service supplier's account, etc.

In one of the previous methods described in FR-A-2 74 B 591, the card produces two signatures, the first of which is called the "long" signature (the public key algorithm) and is intended for the service provider, and the second of which is called the "short" signature (the private key algorithm [hereinafter referred to as "S"]) and which is encapsulated within the first and is intended for the issuer. The service provider checks the long signature and, if the result is correct, provides the service ordered and stores the short signature. At the end of the day, it sends the stored short signatures and the corresponding data to the issuer.

Although the advantage of this structure is its simplicity, it does however cause certain problems when payments are made using an electronic wallet (PME), as it is sometimes necessary to include one or more intermediate actors between the three previously-named parties (the bearer, the service provider and the issuer), depending on requirements for intermediate levels of concentration in calculating running totals of electronic values.

One solution consists in adding intermediate resources called SAMs ("Secure Application Modules") that check one of the two signatures produced by the card and calculate the running total of electronic values received.

If intermediate SAMs could perform the same check as that carried out by the issuer, security levels would be degraded because if the cryptographic algorithm used to produce the signature for the card's issuer used a secret key the issuer's key would have lower security levels than the guarantee provided by the electronic wallet.

If the second, service provider's, signature was produced by a public key algorithm, the intermediate SAMs, like the service provider, would be able to authenticate any transaction sent from a PME. However, in this scenario the signatures would be considerably longer and so more expensive to transfer, store and check.

The aim of the present invention is to remedy precisely these drawbacks.

DESCRIPTION OF THE INVENTION

To this end, the present invention proposes a method using several signatures together with a series of encapsulations and decapsulations. We assume that a communications network is present (a telephone network, for example) linking entities able to communicate together, with the proviso that there are no direct communication channels between two entities wanting to communicate together and that the existing communication channels can be unidirectional.

A transaction calls on a subset of entities, also called "actors", that work together in various capacities in order to carry out the transaction. In practice, these entities or actors are composed of physical resources (terminal, card, microprocessor, etc.)

During the transaction:

an entity i has the necessary resources ($E_{ij}$) to calculate cryptograms for sending to an entity j and/or to check cryptograms sent from j, and an entity j equally has the corresponding resources ($E_{ji}$), where said resources $E_{ij}$ and $E_{ji}$ have been obtained during the phase called the "initialisation" phase (which is carried out before and/or in parallel with the transaction itself). We shall then say that said two entities share a key system notated as $K_{ij}=K_{ji}=\{(i, E_{ij}), (j, E_{ji})\}$. For example:

in the case of a private key system, we obtain: $E_{ij}=E_{ji}=S_{ij}$ in the case of a public key system, we obtain:

$E_{ij}(S_i, P_i)$ and $E_j=(P_i)$ in unidirectional communication, $E_{ij}=(S_i, P_i, P_j)$ and $E_{ji}=(S_j, P_i, P_j)$ in bidirectional communication.

According to this definition, the key system is notionally symmetrical regarding i and j. On the other hand, if we write the cryptogram of a message m sent from i to j as $K_{ij}$ (m), we obtain $K_{ij}$ (m) $K_{ji}$ (m).

Under these conditions and subject to these hypotheses, a message source entity "encapsulates" (i.e. encloses) a message in a sequence of cryptograms based on certain cryptograms that are themselves based on certain cryptograms, etc. All these cryptograms are calculated using key systems that the source entity shares with each of the respective intermediate entities on the communication route. The global cryptogram is sent and each intermediate entity then uses the key system that it shares with the source entity to "decapsulate" (i.e. extract) the cryptogram that it receives and then sends the remaining cryptogram to the next entity. The first calculated cryptogram gradually reaches the destination entity, which uses the appropriate key system to extract the message intended for it.

Depending on the transaction's requirements and the protocols used, the calculated cryptograms can serve to authenticate the actors or the source of the messages, or to ensure that the sending or receiving of these messages cannot be repudiated.

This method assumes the presence of a key system management system (covering all aspects of generating, distributing and/or exchanging the keys needed to establish secure communications with the other actors) that is set up during a phase called "initialisation". Said key management system may be a standard system consisting in a public key infrastructure with a linked key transport protocol, for example.

Certain of the entities involved may play the role of trusted third parties. For example:

in the case of a public key system, this may mean a certification authority;

in the case of a private key system, this may mean a master entity that shares a private key with all of the other entities or a subset of said entities.

A given entity can participate in a transaction in various capacities, such as the following:

1. Relaying information: the entity acts as an intermediate relay and so compensates for the absence of a communication channel directly linking the sender and recipient of a message required in the transaction;
2. Providing desynchronisation: the entity acts as an intermediate cache for messages on behalf of another entity that is the actual recipient of said messages; this intermediate entity therefore:
   compensates for the recipient being temporarily unavailable,
   is designed to be called more often than the recipient itself and acts as an interface grouping messages together, so avoiding the recipient being systematically called with every message.

It is in the interests of the sender and/or the recipient that the information reaches its destination. The intermediate actors must therefore relay the information reliably. There are several specific possible scenarios:

The intermediate actors also have an interest in the information reaching its destination. This is the case, for example, with a retailer in a financial transaction involving a customer (the sender actor) and the payment method management system (the recipient actor);

The sender and/or the recipient trust the intermediate actors to relay the information (but not necessarily to authenticate the source of the information);

The sender and/or recipient actors fully trust the intermediate actors (trusted third parties);

The sender and/or recipient actors place no trust in the intermediate actors; means of ensuring non-repudiation of the sending and receiving of a message must then be set up.

To be precise, the invention concerns a method for carrying out an electronic transaction across a communication network linking several entities; this method is characterised in that it is made up of the following operations:

a) A first entity builds a first message combining all of the transaction data and calculates a first cryptogram of this first message using a first key system that it shares with the last $n^{th}$ entity; said first entity then links a second message with the first cryptogram and calculates a second cryptogram of the whole using a second key system that it shares with the last but one $(n-1)^{th}$ entity, and so on; the first entity links an $(n-1)^{th}$ message with the $(n-2)^{th}$ cryptogram previously obtained and calculates an $(n-1)^{th}$ cryptogram of the whole using the $(n-1)^{th}$ key system that it shares with the second entity; the first entity then sends the last calculated cryptogram across the communication network;

b) the second entity receives said last cryptogram, uses the appropriate key system to extract the $(n-1)^{th}$ message from the $(n-1)^{th}$ cryptogram containing it and sends the remaining said $(n-2)^{th}$ cryptogram to the third entity, and so on; said $n^{th}$ entity receives the first cryptogram and uses the appropriate key system to extract said first message that it contains.

Under the terms of this definition, the "first entity" is not necessarily the message's source entity, although this may be the case. Similarly, the "last entity" is not necessarily the message's in fine destination entity, although this may be the case. In the previous scenario, the communication network therefore only includes entities that share a key system with the first entity; the transaction then takes place between the first entity, which is the message source, and the last entity, which is the message recipient.

The transaction information is therefore fully encapsulated at its source, and is progressively decapsulated until it reaches the recipient.

In a variation of the preferred embodiment, encapsulation is shared (or spread). In this case, the communication network includes a first group of entities made up of a first entity and (i−1) others, each of which shares a key system with said first entity, and a second group of entities made up of a first entity that is the last entity of said first group, i.e. entity i, and (n−i) others. Entity i shares a key system with each of entity i's (n−i) following entities. This method is comprised of two successive stages:

a first stage, in which the message built by the first entity of the first group is sent to the $i^{th}$ entity of the first group in accordance with operations a) and b) described above;

a second stage, in which the message extracted by the first entity of the second group is sent to the last entity of the second group in accordance with said operations a) and b).

It is generally possible to combine the preferred embodiments defined above. The communications network can therefore include a first group of entities made up of a first entity and (i−1) others that share a key system with said first entity, a second group of entities made up of a first entity that is the last entity of the first group and (j−i+1) others that share a key system with said first entity of the second group, a third group of entities made up of a first entity that is the last entity of the second group and (n−j) others, where the (n−j+1) entities of this third group share a key system with the first entity of the first group, this method being characterised in that:

the first entity of the first group performs operations a) above, using the key systems that it shares with all other entities in the first and third groups;

the entities in the first group process the cryptograms that they receive in accordance with operations b) defined above;

the first entity of the second group performs operations a) above, using the key systems that it shares with all other entities in the second group;

the entities in the second group process the cryptograms that they receive in accordance with operations b) defined above;

the entities in the third group process the cryptograms that they receive in accordance with operations b) above.

The present invention also covers an embodiment of this method relating to electronic wallet payments.

DETAILED DESCRIPTION OF THE PREFERRED EMBODIMENTS

Data authenticity is obtained through techniques employing encryption, authentication or signature mechanisms.

The term "signature" used in the rest of this document refers to cryptograms obtained by using signature mechanisms that are either based on public key algorithms (where the message may or may not be collected) or on private key ("MAC", or "Message Authentication Code") algorithms.

The following notation is used in the rest of this document:

$M_{i,j}$: a message built by entity i and intended for entity j. It is perfectly valid for a message built by entity i to be empty, identical to a message built by another entity j ($m_{i,1}=m_{j,1}$ for i≠j and 1 datum), or else a cryptogram. In the case of payments by PME (electronic wallet) cards, $m_{i,j}$ will indicate transaction data, for example (including anti-replay components).

$k_{i,j}(m)$: the cryptogram of message m, calculated by i using key system $k_{i,j}$. The calculation algorithm for this cryptogram depends on the invention's embodiment. There are no restrictions to which algorithm may be used to calculate this cryptogram. It may be any of the following, for example:
1. a public key algorithm (RSA, DSA, etc.) or a private key algorithm (MAC-DES, etc.);
2. a signature algorithm or encryption algorithm. In the case of a signature, it is implicitly assumed that the cryptogram used allows the message to be collected. This hypothesis is not restrictive, as $K_{i,j}(m)$ may be replaced by $k'_{i,j}(m)=k_{i,j}(m) | lm$, where | | indicates the concatenation of messages.

The $k_{i,j}(X,m)$ notation is considered equivalent to $k_{i,j}(X||m)$, provided that both parties present have agreed on length X.

In the rest of this document, message X will itself be a cryptogram, K(m'). We will use the term "encapsulation" to describe the use of a cryptogram X=K'(m) as a message.

When cryptogram $K_{i,j}(X,m)$ is intended to preserve the message's integrity but the channels that it must follow are controlled by entities that have an interest in X being transferred, we can obtain $K_{i,j}(K(m'), m)=K(m')||K'_{i,j}(m)$, for example, where there are no restrictions to which algorithm may be used to calculate the cryptograms.

We will describe four examples of preferred embodiments for this method:

Example 1

Total Encapsulation at Source and Progressive Decapsulation

The source builds a message $m_{1,n}$ combining all of the transaction data and calculates a first cryptogram $K_{1,n}(m_{1,n})$ of this first message using a first key system $K_{1,n}$ that it shares with the last $n^{th}$ entity; the source then links a second message $m_{1,n-1}$ with the first cryptogram and calculates a second cryptogram $K_{1,n-1}(K_{1,n}(m_{1,n}),m_{1,n-1})$ of the whole using a second key system $K_{1,n-1}$ that it shares with the last but one $(n-1)^{th}$ entity, and so on; the first entity links an $(n-1)^{th}$ message $m_{1,2}$ with the (n-2) cryptogram previously obtained and calculates an (n-1) cryptogram of the whole using the (n-1) key system $K_{1,2}$ that it shares with a second entity; the source then sends the last calculated cryptogram across the communication network to entity 2.

We can represent this first stage in the following diagram, where the arrow pointing towards the right symbolises information being transferred between entity 1 (left) and entity 2 (right):

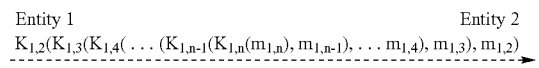

Entity 2, which receives the message from entity 1, partially decapsulates this message using key system $K_{1,2}$; entity 2 checks (and possibly stores) the cryptogram intended for it (in this case the signature of message $m_{1,2}$), then sends the rest of the message to entity 3. Using the same conventions, we therefore obtain the following diagram:

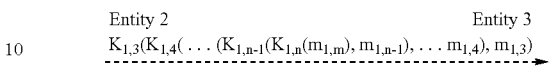

This method is then repeated so that the message gradually reaches entity n. For the intermediate entities i and i+1, we obtain:

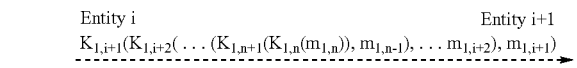

Lastly, the last but one entity (n-1) sends the last cryptogram $K_{1,n}(m_{1,n})$ to recipient (n) which uses key system $K_{1,n}$ to retrieve the message intended for it:

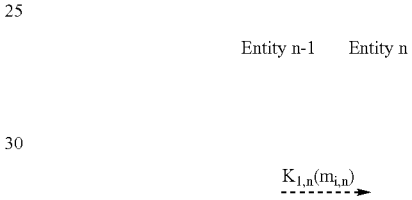

Example 2

Shared Encapsulation

Entity 1 shares a key system with only some of the entities on the communication route, i.e. entities 2, . . . , i, which make up a first group. Entity i in turn shares a key system with each of the following entities: i+1, i+2, . . . , n, so forming a second group.

Entity 1 builds a message for the last entity, i, of the first group (i.e. $m_{1,i}$) and encapsulates this message using the key systems that it shares with each of the entities in the first group, and then sends the whole to entity 2:

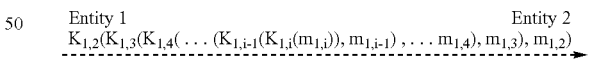

In this first group, the entities progressively decapsulate the cryptograms until the last but one entity, i-1, sends the message cryptogram that it has received to the last entity, i:

Entity i then encapsulates all of the messages $M_{i,i+1}$, $M_{i,i+2}$, . . . $M_{i,n}$ intended for the entities of the second group. The content of these messages can depend on the cryptogram received. The result of this encapsulation is then sent using the method previously described, firstly from entity i to entity i+1:

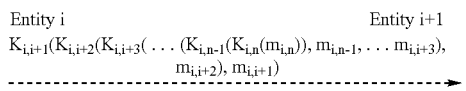

and so on through the entities of the second group until the last but one entity, n-1, which sends the last cryptogram to recipient n.

Example 3

General Scenario

Entity 1 shares a key system with some of the entities on the communication route, which for the purposes of simplicity in this presentation we will suppose to be 2, ..., i, j+1, ..., n. Entity 1 therefore partially encapsulates the data as shown in the following diagram:

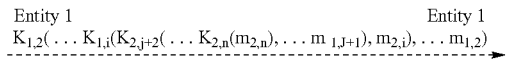

Each intermediate entity uses the appropriate key system to decapsulate the message that it receives, until the message reaches entity i:

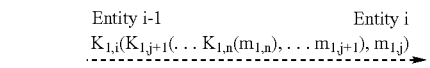

Each actor (in this case, only "i") extracts the message sent to it, so obtaining the remainder of the message intended for an actor that is not adjoining it on the route, and then re-encapsulates it for the adjoining entity and any following entities.

In this example, entity i shares a key system with each of the following entities: i+1, i+2, ..., j. Entity i receives the message from i-1, partially decapsulates this message and then re-encapsulates the obtained message in order to send to i+1, i+2, ..., j.

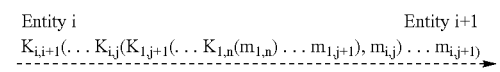

Each intermediate entity then uses the key system to decapsulate the message that it receives, until the message reaches entity j:

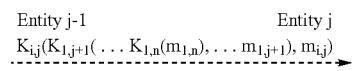

Entity j decapsulates this message again. Said decapsulated message is then sent gradually from j+1 to n:

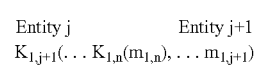

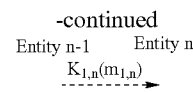

In this example, we can illustrate the previously described scenario, in which some $K_{i,j}(\ldots)$ cryptograms are in $K_{i,j}(X,m)=X, K_{i,j}(m)$ form. Entity i does not encapsulate the messages intended for i+1, i+2, ..., j, because the channels are considered secure and there is no reason for the entities involved to falsify the messages.

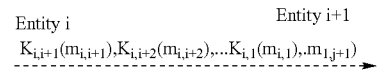

Each intermediate entity receives and checks the message sent to it, using the key system, until the message reaches entity j.

Entity j receives and checks the message sent to it. This message is then sent gradually from j+1 to n:

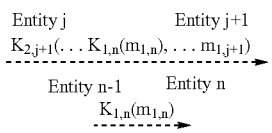

Example 4

Electronic Wallet (PME)

In this example, the entities (or actors) are as follows:
PME cards (A),
service points (P) that are capable of receiving the cards,
service point concentrators, together with their security module (MS),
an issuer (E) responsible for issuing the PME cards and for obtaining the electronic money.

The communication network connects the service points to the concentrators and the concentrators to the issuer.

By hypothesis:
A and MS share a key system, $K_{A,M}$,
A and E share a key system, $K_{A,E}$,
A and P share a key system, $K_{A,P}$.

The following notations are used:
K(m): the cryptogram of message m obtained using key system K,
$NT_A$: transaction number from PME A,
$NT_{MS}$: transaction number from MS,
$ID_{PME}$: PME identifier,
$ID_{MS}$: MS identifier.

After the previous stage in which keys are exchanged, A, P and MS exchange information relating to the transaction number $NT_A$ and to the PME identifier:

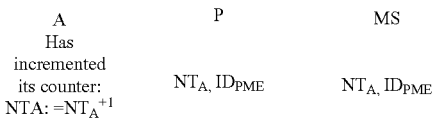

The security module increments and then sends its transaction number $NT_{MS}$ to entity P, together with its identity; entity P then resends said information to entity A.

Card A checks the data that it has received and resets the running total to zero (RunningTotal=0).

The service unit consumption cycle then begins. The following operations are then performed:

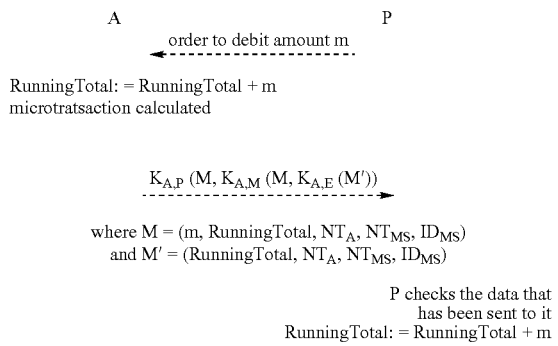

The process then returns to the beginning of the cycle if use of the service is not complete. At the end of the service session, the following final exchange takes place:

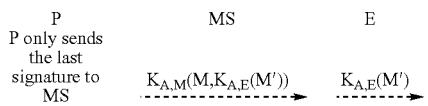

The invention claimed is:

1. A method for carrying out an electronic transaction across a communication network linking several entities comprising the following steps:

a) a first entity builds a first message combining transaction data and calculates a first cryptogram of said first message using a first key system that said first entity shares with a last ($n^{th}$) entity; said first entity then links a second message with said first cryptogram and calculates a second cryptogram of said second message linked with said first cryptogram using a second key system that said first entity shares with an $(n-1)^{th}$ entity, and so on; said first entity links an $(n-1)^{th}$ message with an $(n-2)^{th}$ cryptogram previously obtained and calculates an $(n-1)^{th}$ cryptogram of said $(n-1)^{th}$ message linked with said $(n-2)^{th}$ cryptogram using an $(n-1)^{th}$ key system that said first entity shares with a second entity; said first entity then sends a last calculated cryptogram across the communication network;

b) said second entity receives said last cryptogram, uses an appropriate key system to extract said $(n-1)^{th}$ message from said $(n-1)^{th}$ cryptogram containing said $(n-1)^{th}$ message, and sends said remaining $(n-2)^{th}$ cryptogram to a third entity, and so on; said $n^{th}$ entity receives said first cryptogram and uses an appropriate key system to extract said first message contained within said first cryptogram.

2. A method in accordance with claim 1, whereby the communication network therefore only includes entities that share a key with a first entity; the transaction then takes place between this first entity, which is the message source, and the last entity, which is the message recipient.

3. A method in accordance with claim 1, whereby the communication network includes a first group of entities made up of a first entity and (i−1) others, each of which shares a key system with said first entity, and a second group of entities made up of a first entity that is the last entity of this first group, i.e. entity i, and (n−i) others, and whereby entity i shares a key system with each of the (n−1) following entities, said method being made up of two successive stages:

a first stage, in which the message built by the first entity of the first group is sent to the $i^{th}$ entity of the first group in accordance with operations a) and b) in claim 1;

a second stage, in which the message extracted by the first entity of the second group is sent to the last entity of the second group in accordance with said operations a) and b) in claim 1.

4. A method in accordance with claim 1, whereby the communications network is composed of a first group of entities made up of a first entity and (i−1) others that share a key system with said first entity, a second group of entities made up of a first entity that is the last entity of this first group and (j−i+1) others that share a key system with said first entity of this second group, a third group of entities made up of a first entity that is the last entity of said second group and (n−j) others, where the (n−j+1) entities of this third group share a key system with said first entity of the first group, this method being characterised in that:

the first entity of the first group performs operations a) set forth in claim 1, using the key systems that it shares with all other entities in the first and third groups;

the entities in the first group process the cryptograms that they receive in accordance with operations b) set forth in claim 1;

the first entity of the second group performs operations a) set forth in claim 1, using the key systems that it shares with all other entities in this second group;

the entities in the second group process the cryptograms that they receive in accordance with operations b) set forth in claim 1;

the entities in the third group unencrypt the cryptograms that they receive in accordance with operations b) set forth in claim 1.

5. A method in accordance with claim 1, whereby a group's first entity, i, calculates a cryptogram of the messages intended for the group's other entities, i+1, i+2, . . . , j, without encapsulating them, and whereby each entity i+1, i+2, . . . , j receives and checks the message intended for it using its key system that it shares with i.

6. A method in accordance with claim 1, whereby the electronic transaction is a payment and whereby the entities are composed of cards (A), service points (P) capable of receiving said cards (A), service point concentrators equipped with a security module (MS) and connected to the service points and an issuer (E) responsible for issuing electronic payment cards and obtaining the electronic money, the communication network connecting service points (P) with the concentrators and said concentrators with the issuer, whereby each card (A) shares a key system $K_{A,M}$ with a security module (MS), whereby each card A also shares a key system $K_{A,E}$ with the issuer (E), and whereby each card (A) shares a key system $K_{A,P}$ with a service point (P).

7. A method in accordance with claim 6, in which:

a) the card (A):

calculates a message (M') intended for the issuer (E), whereby said message contains the running total of the amounts paid, the transaction number ($NT_A$), the transaction number ($NT_{MS}$) of the security module (MS) to which the service point is connected and the identifier of said security module ($ID_{MS}$), calculates a first cryptogram $K_{A,E}(M')$ of said message using key system $K_{A,E}$ that it shares with the issuer, adds a message (M) containing the transaction amount (m), running total, transaction numbers ($NT_A$, $NT_{MS}$) and identifier ($ID_{MS}$) to said first cryptogram, encapsulates the result in a second cryptogram $K_{A,M}(M, K_{A,E}(M'))$ using key system $K_{A,M}$ that it shares with the security module (MS), adds message M to said second cryptogram, encapsulates the result in a third cryptogram $K_s(M, K_{A,M}(M, K_{A,E}(M')))$ using key system $K_{A,P}$, sends said third cryptogram to the service point (P), b) said service point (P) uses key system $K_{A,P}$ to decapsulate the cryptogram that it has received, retrieves and checks message M and records $K_{A,M}(M, K_{A,E}(M'))$, and whereby the method is repeated if use of the service has not ended, c) when the service session ends the service point (P) resends the last message $K_{A,M}(M, K_{A,E}(M'))$ to the security module (MS), d) said security module (MS) uses key system $K_{A,M}$ to decapsulate the cryptogram that it has received, retrieves the message (M) and sends $K_{A,E}(M')$ to the issuer, e) said issuer (E) uses key system $K_{A,E}$ to decapsulate the cryptogram that it has received and extracts the message (M') intended for it.

\* \* \* \* \*

UNITED STATES PATENT AND TRADEMARK OFFICE
CERTIFICATE OF CORRECTION

PATENT NO. : 7,079,654 B2
APPLICATION NO. : 10/031039
DATED : July 28, 2006
INVENTOR(S) : Remery et al.

It is certified that error appears in the above-identified patent and that said Letters Patent is hereby corrected as shown below:

In Column 5, line 53, please delete "(n-2)" and insert --$(n-2)^{th}$--
In Column 5, line 54, please delete "(n-1)" and insert --$(n-1)^{th}$--
In Column 5, line 55, please delete "(n-1)" and insert --$(n-1)^{th}$--
In Column 6, line 10, please delete "$K_{1,3}$ ($K_{1,4}$ (... ($K_{1,n-1}$ ($m_{1,m}$), $m_{1,n-1}$), ... $m_{1,4}$), $M_{1,3}$) and insert --$K_{1,3}$ ($K_{1,4}$ (... ($K_{1,n-1}$ ($m_{1,n}$), $m_{1,n-1}$), ... $m_{1,4}$), $M_{1,3}$)--
In Column 6, line 18, please delete "$K_{1,i+1}$ ($K_{1,i+2}$(...($K_{1,n+1}$ ($K_{1,n}(m_{1,n})$),$m_{1,n-1}$),...$m_{1,i+2}$),$m_{1,i+1}$)" and insert --$K_{1,i+1}(K_{1,i+2}(...(K_{1,n-1}(K_{1,n}(m_{1,n})),m_{1,n-1}),...m_{1,i+2}),m_{1,i+1})$--
In Column 7, line 24, please delete "$K_{1,2}(...K_{1,i}(K_{2,j+2}(...K_{1,n}(m_{1,n}),...m_{1,j+1}),m_{1,i})...m_{1,2}$" and insert --$K_{1,2}(...K_{1,i}(K_{1,j+1}(...K_{1,n}(m_{1,n}),...m_{1,j+1}),m_{1,i})...m_{1,2})$--
In Column 8, line 16, please delete "$K_{i,i+1}(m_{i,i+1}),K_{i,i+2}(m_{i,i+2}),...K_{i,1}(m_{i,1}),.m_{1,j+1}$" and insert --$K_{i,i+1}(m_{i,i+1}),K_{i,i+2}(m_{i,i+2}),...K_{i,1}(m_{i,1}),K_{1,j+1}(K_{1,n}(m_{1,n}),...m_{1,j+1}$--
In Column 8, line 33, please delete "$K_{2,j+1}(...K_{1,n}(m_{1,n}),...m_{1,j+1})$" and insert --$K_{1,j+1}(...K_{1,n}(m_{1,n}),...m_{1,j+1})$--
In Column 9, lines 14, 15, 16 and 17 please insert the following:

--MS
MS increments its
counter:
$NT_{MS}=NT_{MS}+1$--

Signed and Sealed this

Fifth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 7,079,654 B2
APPLICATION NO. : 10/031039
DATED : July 18, 2006
INVENTOR(S) : Remery et al.

It is certified that error appears in the above-identified patent and that said Letters Patent is hereby corrected as shown below:

In Column 5, line 53, please delete "(n-2)" and insert --$(n-2)^{th}$--
In Column 5, line 54, please delete "(n-1)" and insert --$(n-1)^{th}$--
In Column 5, line 55, please delete "(n-1)" and insert --$(n-1)^{th}$--
In Column 6, line 10, please delete "$K_{1,3}$ ($K_{1,4}$ (. . . ($K_{1,n-1}$ ($m_{1,m}$), $m_{1,n-1}$) , . . . $m_{1,4}$) , $M_{1,3}$) and insert --$K_{1,3}$ ($K_{1,4}$ (. . . ($K_{1,n-1}$ ($m_{1,n}$), $m_{1,n-1}$) , . . . $m_{1,4}$) , $M_{1,3}$)--
In Column 6, line 18, please delete "$K_{1,i+1}$ ($K_{1,i+2}$(...($K_{1,n+1}$ ($K_{1,n}(m_{1,n})$),$m_{1,n-1}$),...$m_{1,i+2}$),$m_{1,i+1}$)" and insert --$K_{1,i+1}(K_{1,i+2}(...(K_{1,n-1} (K_{1,n}(m_{1,n})),m_{1,n-1}),...m_{1,i+2}),m_{1,i+1})$--
In Column 7, line 24, please delete "$K_{1,2}(...K_{1,i}(K_{2,j+2}(...K_{1,n}(m_{1,n}),...m_{1,j+1}),m_{1,i})...m_{1,2}$" and insert --$K_{1,2}(...K_{1,i}(K_{1,j+1}(...K_{1,n}(m_{1,n}),...m_{1,j+1}),m_{1,i})...m_{1,2})$--
In Column 8, line 16, please delete "$K_{i,i+1}(m_{i,i+1}),K_{i,i+2}(m_{i,i+2}),...K_{i,1}(m_{i,1}),.m_{1,j+1}$" and insert --$K_{i,i+1}(m_{i,i+1}),K_{i,i+2}(m_{i,i+2}),...K_{i,1}(m_{i,1}),K_{1,j+1}(K_{1,n}(m_{1,n}),...m_{1,j+1}$--
In Column 8, line 33, please delete "$K_{2,j+1}(...K_{1,n}(m_{1,n}),...m_{1,j+1})$" and insert --$K_{1,j+1}(...K_{1,n}(m_{1,n}),...m_{1,j+1})$--
In Column 9, lines 14, 15, 16 and 17 please insert the following:

--MS
MS increments its
counter:
$NT_{MS}=NT_{MS}+1$--

This certificate supersedes Certificate of Correction issued December 5, 2006.

Signed and Sealed this

Second Day of January, 2007

JON W. DUDAS
*Director of the United States Patent and Trademark Office*